United States Patent
Yin et al.

(10) Patent No.: US 9,195,653 B2
(45) Date of Patent: Nov. 24, 2015

(54) IDENTIFICATION OF IN-CONTEXT RESOURCES THAT ARE NOT FULLY LOCALIZED

(75) Inventors: Jun Yin, Shanghai (CN); Piotr Powalowski, Zielona Gora (PL); Peter Yung Sen Chen, Los Altos, CA (US)

(73) Assignee: Google Inc., Mountain View, CA (US)

( * ) Notice: Subject to any disclaimer, the term of this patent is extended or adjusted under 35 U.S.C. 154(b) by 660 days.

(21) Appl. No.: 13/279,666

(22) Filed: Oct. 24, 2011

(65) Prior Publication Data

US 2015/0154159 A1 Jun. 4, 2015

(51) Int. Cl.
| | |
|---|---|
| G06F 17/20 | (2006.01) |
| G06F 17/28 | (2006.01) |
| G06F 17/21 | (2006.01) |
| G06F 9/44 | (2006.01) |

(52) U.S. Cl.
CPC ............ G06F 17/289 (2013.01); G06F 9/4448 (2013.01); G06F 17/211 (2013.01)

(58) Field of Classification Search
USPC .................................................. 704/1, 5, 8, 9
See application file for complete search history.

(56) References Cited

U.S. PATENT DOCUMENTS

| | | | | |
|---|---|---|---|---|
| 6,275,790 B1 * | 8/2001 | Yamamoto et al. | ................. | 704/8 |
| 6,442,516 B1 * | 8/2002 | Lee et al. | ............................ | 704/8 |
| 6,782,529 B2 * | 8/2004 | Kumhyr | ......................... | 717/111 |
| 7,171,352 B2 * | 1/2007 | Chang et al. | ....................... | 704/9 |
| 7,207,005 B2 * | 4/2007 | Lakritz | ........................... | 715/201 |
| 7,441,184 B2 * | 10/2008 | Frerebeau et al. | ............. | 715/234 |
| 7,447,624 B2 * | 11/2008 | Fuhrmann | ......................... | 704/8 |
| 7,461,123 B2 * | 12/2008 | Hauduc et al. | ................. | 709/203 |
| 7,552,452 B2 * | 6/2009 | McHugh et al. | ............... | 719/331 |
| 7,580,951 B2 * | 8/2009 | Blair-Stanek | .......................... | 1/1 |
| 7,596,777 B2 * | 9/2009 | Fallen-Bailey et al. | ........ | 717/103 |
| 7,657,554 B2 * | 2/2010 | Murphy et al. | ................ | 707/803 |
| 7,774,195 B2 * | 8/2010 | Kohlmeier et al. | ................ | 704/8 |
| 7,836,401 B2 * | 11/2010 | Hathaway | ...................... | 715/714 |
| 7,908,260 B1 * | 3/2011 | Bushee | .......................... | 707/705 |
| 8,645,928 B2 * | 2/2014 | Chu et al. | ........................ | 717/136 |
| 8,671,389 B1 * | 3/2014 | Buryak et al. | ................. | 717/109 |
| 2002/0002452 A1 * | 1/2002 | Christy et al. | ..................... | 704/3 |
| 2002/0123878 A1 * | 9/2002 | Menke | .............................. | 704/2 |
| 2002/0123879 A1 * | 9/2002 | Spector | .............................. | 704/2 |
| 2003/0084401 A1 * | 5/2003 | Abel et al. | .................. | 715/501.1 |
| 2003/0135358 A1 * | 7/2003 | Lissauer et al. | ..................... | 704/2 |
| 2003/0135501 A1 * | 7/2003 | Frerebeau et al. | ............. | 707/100 |
| 2004/0056894 A1 * | 3/2004 | Zaika et al. | .................... | 345/762 |
| 2004/0064807 A1 * | 4/2004 | Rose et al. | .................... | 717/145 |
| 2004/0088155 A1 * | 5/2004 | Kerr et al. | ......................... | 704/8 |
| 2004/0128614 A1 * | 7/2004 | Andrews et al. | ........... | 715/501.1 |
| 2004/0168132 A1 * | 8/2004 | Travieso et al. | .............. | 715/536 |
| 2004/0237044 A1 * | 11/2004 | Travieso et al. | .............. | 715/530 |
| 2006/0069809 A1 * | 3/2006 | Serlet | ............................ | 709/248 |
| 2006/0156278 A1 * | 7/2006 | Reager | ........................... | 717/104 |
| 2007/0226687 A1 * | 9/2007 | Fallen-Bailey et al. | ........ | 717/110 |
| 2008/0129865 A1 * | 6/2008 | Leonard | ........................ | 348/468 |
| 2008/0295009 A1 * | 11/2008 | Huang et al. | .................. | 715/764 |
| 2010/0011354 A1 * | 1/2010 | Gharabally et al. | ........... | 717/178 |
| 2011/0283261 A1 * | 11/2011 | Yun | ............................... | 717/124 |

* cited by examiner

*Primary Examiner* — Edgar Guerra-Erazo
(74) *Attorney, Agent, or Firm* — Remarck Law Group PLC

(57) ABSTRACT

Applications can be localized by localization experts to allow them to be used by a broader customer base. The localization can be done given interface context to produce more applicable results. A localization expert may determine that certain content within the interface context should be localized, however is not localizable by the expert. The localization expert may indicate that the content is localizable and the developer may receive the indication and provide the localization expert with updated interface context allowing localization of the previously un-localizable content.

20 Claims, 7 Drawing Sheets

IDENTIFICATION OF IN-CONTEXT RESOURCES THAT ARE NOT FULLY LOCALIZED

BACKGROUND

A localization expert can modify an application for numerous reasons, such as to make the application more useful for a larger audience, to make the application more applicable to a different culture, to account for differences in distinct markets, etc. The application may be modified by modifying a resource such as a text string, color and style settings, image and style icon files, sound files, etc. For example, software originally designed for the United States market may generate an error message containing a text string in English if a user clicks a specific button within the software. A localization expert may localize the error message such that a Chinese-speaking user in the Chinese market may be able to understand the localized error message in a similar way that an English-speaking user in the United States market understands the original message. Accordingly, the same or similar software can be used by a larger number of users.

The localization expert may require context data regarding the application to provide a localization. Without sufficient context data, the localization provided by the expert may not be correct for the application as the meaning of the resource to be localized may be ambiguous. For example, if the localization expert is only given a list of the resources to be translated from one language to another, the translation provided by the expert may not accurately reflect the meaning of the original resources. More specifically, if the application contains multiple resources with the phrase "Enter", a localization expert with only a list of the resources to be localized may not be able to distinguish between the "Enter" which requires pressing the Enter Key and "Enter" which grants a user access to a portion of the application.

BRIEF SUMMARY

According to an embodiment of the disclosed subject matter, a first snapshot of an interface based upon an application may be displayed, which may have a first editable text string in English and a first non-editable text string in English. An indication that the first English non-editable text string of the first snapshot is translatable may be received and an indication that the first non-editable English text string is translatable may be sent. A second snapshot of the interface based upon the application may be received, which may include a second editable English text string that corresponds to the first non-editable English text string. A translation of the second editable English text string also may be received.

According to an embodiment of the disclosed subject matter, first context information of an interface based upon an application may be displayed, which has a first editable portion and a first non-editable portion. An indication that the first non-editable portion of the first context information is localizable may be received and an indicator message based on the indication may be sent. A first highlighted snapshot based on the first non-editable portion may be received. Second context information of the interface may be received based upon the application, the second context information including a second editable portion corresponding to the first non-editable portion. A second highlighted snapshot based on the second editable portion may be received. The first non-editable portion may be text based and may include a text string. The first non-editable portion may be non-text based and may include an image. A localization edit corresponding to the second editable portion may be received, which can include a modification of character, font, font style, text effect, spacing, color, size, color, scaling ratio, shade, brightness, contrast, content, shadow, artistic effect, reflection settings, or bevel corresponding to the second editable portion. A localization comment corresponding to the indication that the first non-editable portion is localizable may be received and may include an explanation of the indication. The first context information may be a snapshot based on the application. A rating corresponding to the indication that indicates a priority value for the indication may be received.

Additional features, advantages, and embodiments of the disclosed subject matter may be set forth or apparent from consideration of the following detailed description, drawings, and claims. Moreover, it is to be understood that both the foregoing summary and the following detailed description are exemplary and are intended to provide further explanation without limiting the scope of the claims.

BRIEF DESCRIPTION OF THE DRAWINGS

The accompanying drawings, which are included to provide a further understanding of the disclosed subject matter, are incorporated in and constitute a part of this specification. The drawings also illustrate embodiments of the disclosed subject matter and together with the detailed description serve to explain the principles of embodiments of the disclosed subject matter. No attempt is made to show structural details in more detail than may be necessary for a fundamental understanding of the disclosed subject matter and various ways in which it may be practiced.

DETAILED DESCRIPTION

Figure 3:
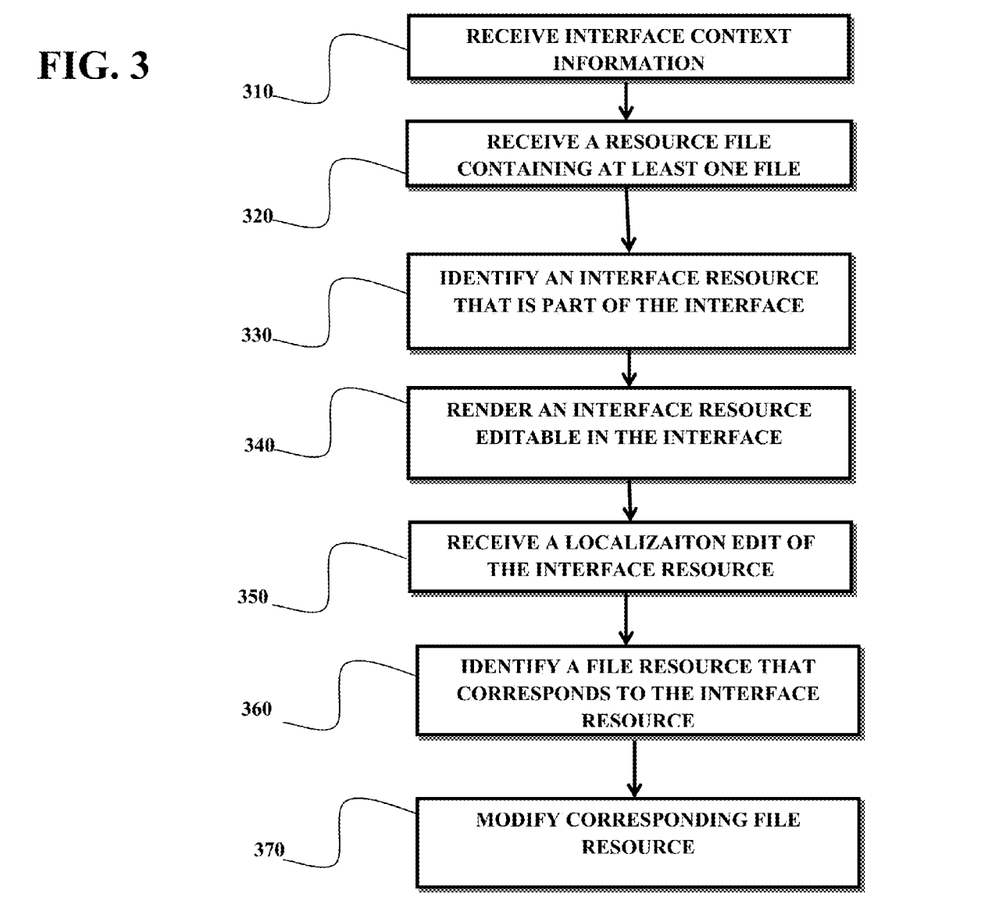
FIG. 3 shows an example process for providing context information to a localization expert according to an embodiment of the disclosed subject matter.

As shown in FIG. 3, according to embodiments of the disclosed subject matter, context information about an interface of an application can be provided to a localization expert. Context information about an interface can include text data, image data, audio data, video data, color and style settings, HTML, XML, a CSS data, layout information, executable or interpreted code, etc., and any other information relating to the content, layout and behavior of all or part of a user interface. The context information may be received at 310. The context information may be based on one or more of a variety of applications, including, but not limited to, web-based applications, mobile applications, desktop applications, a snapshot of an application, etc., or any other applicable application or a combination thereof. The context information may be used to render a localization interface using, at least in part, HyperText Markup Language (HTML), Extensible Markup Language (XML), and the like, and any other information useful in displaying information. The context information also may contain interface resources that may be editable within the interface at 340. Further, the localization interface may be rendered at 320 based at least in part on a resource file containing file resources that are associated with localizable aspects of the application. The file resources may contain a list of pairs that can be used to identify the resource and the content of the resource at 330. The format of the file resources may vary based on the application, localization expert, developer, etc. The format may be based on, but is not limited to, Java properties files, GWT/UI Binder (Java properties including comments for resources), an XML format, etc., or a combination thereof.

For example, a Java properties resource file that corresponds to messages or errors within the application can contain the following code:

```
project.message.okay = Press okay to continue
project.message.user = User %s logged out
project.error.noData = Found only %d data points!
```

A GWT/UI Binder formatted resource file that corresponds to the same or similar messages or errors within the application can contain the following code:

```
# Shown to user in registration form.
project.message.okay = Press okay to continue
# Shown to user on log out event. Placeholder %s shows user name.
project.message.user = User %s logged out
```

An XML format resource file that corresponds to the same or similar messages or errors within the application can contain the following code:

```
<message>
    <id>project.message.user</id>
    <text>User %s logged out</text>
    <comment>Shown to user on log out event.</comment>
    <placeholders>
        <placeholder>
            <text>%s</text>
            <example>John</example>
            <comment>Placeholder %s shows user
            name.</comment>
        </placeholder>
    </placeholders>
</message>
```

In the examples shown, each of the messages "Press okay to continue," "User % s logged out," and "Found only % d data points" may represent a resource that can be localized. The resources may be obtained from the associated resource files as described herein.

The localization expert may provide a localization edit at 350 by altering an editable portion of the context information that was rendered to the localization expert at 340. The editable portion of the context information can be a localization interface resource. A localization file resource corresponding to the localization interface resource may be identified at 360. A change to context information can be reflected in a change to the corresponding resource in the localization resource file at 370.

Context information that can be used to render a localization interface may be based on a web-based application. The context information can be at least partly generated by activating a browser plugin. The plugin may extract context information from the application and may further extract such information based upon multiple application interface instances (e.g., screen shots) to determine any changes from one or more interface instances to another interface instance. Based on the application interface or changes across interface instances, the plugin may obtain application interface resources. These interface resources may be aspects of the interface that can be made editable by the localization expert in a localization interface. The interface resources may directly correspond to file resources of the application. The interface resources may be obtained by sending a request for a Domain Object Model tree (DOM tree) and Cascading Style Sheet data (CSS) to an application (such as a stand-alone program, an online service, etc.) and detecting interface resources based on the request. For example, regarding Web based applications, the user can install and use a browser plug-in that detects when the page that user is viewing has changed. This can be done by listening to the public notifications and/or detecting the events of all or part of the structure of the page. The events of all or part of the structure of the page can be obtained when the plug-in requests a current DOM tree of the page elements and their CSS styling from the browser. This can contain exactly the interface elements (resources) present (e.g., visible, present but not displayed, etc.) at the moment, including those that may be dynamically created by JavaScript, loaded resources and elements based on retrieved data requests. The plug-in can send all or part of the data to a server for final assembly. The data can include not only HTML and CSS code, but also other resources, such as images and the background used in the page. On the server side, non-interface elements of the DOM tree can be removed and CSS styles can be added as one of the nodes of the DOM tree. The result may be transformed into HTML text or any other suitable form.

Context information based on a mobile application may be generated by extracting embedded text or images from the mobile application. The mobile application may be an application for any mobile technology, including mobile phones (e.g., QWERTY based phones, touchscreen phones, flip based phones, slide based phones, operating systems loaded phones, etc.), tablets (e.g., capable of processing audio-visual data including books, periodicals, movies, music, games, and web content which may be QWERTY based, touch screen based, flip based, etc.) or any other applicable mobile technology. The extraction may be conducted through Optical Character Recognition (OCR) techniques, by reading text in HTML, etc. The implementation may extract location data corresponding to interface resources (e.g., locations at which photographs or videos were taken, stored locations of the mobile platform at the time of a phone call or text message (sent or received), or the like). The location data can be used to allow the localization expert to localize elements of the application by allowing a localization expert to visually see the location of the interface resource.

Some mobile systems allow developers to run their applications on a desktop machine in an emulated mode. These systems grant the emulator program access to the basic structure of presented elements for the purpose of rendering those presented elements. For example, a developer may use the emulator program to visually see a mobile application's home screen on a desktop computer. To capture snapshots of mobile applications, the user can connect the mobile device to a desktop computer and run an application on the mobile device. In accordance with embodiments of the disclosed subject matter, the application can access the interface elements structure and their basic information and retrieve the position (coordinates in mobile screen) for each displayed element and embedded text (if any). It can also retrieve an image and/or snapshot of a widget as an image file, such as a .jpeg or .png file. The retrieved data can be sent to a server and assembled into an HTML structure. The server can create an HTML file for each snapshot taken. For example, each file can have a snapshot of the whole application set as a background, and can contain HTML tags to represent interface elements. As a specific example, for each interface element found in the interface, the application can place a <div> HTML element in an absolute position, according to the coordinates found. The absolute position can be the exact position the interface element is located on the snapshot. Placing a <div> element at the absolute position can avoid incorrectly tagging the interface resource in the event of a resize of the snapshot or the like. For example, the <div> element may be placed based on the coordinates of the message box within the application interface. The coordinates may be based on screen resolution, pixel difference, relative position based on another element, or the like. Based on the <div> element, the system can obtain a snapshot image and textual content from the background and text of the application, respectively. The resulting HTML page can be transformed into an HTML based snapshot. Other techniques for creating and providing the interface elements may be used.

A localization interface based on a snapshot may be generated by extracting context information and application interface resources from an application interface snapshot. For example, the context information and application interface resources may be generated by extracting embedded text or images from within the application interface. The extraction may be conducted through an OCR technique, pattern recognition, file extraction or file copy, or any other applicable extraction technique. Some applications may use "widgets" as interface elements, which can include pre-defined interface features such as buttons, switches, input entries, and the like. For widget detection, sub-parts of a snapshot can be compared with known widget images such as geometric shapes, buttons, switches, windows or other similar widget interface elements. The known widget images can be detected on the snapshots. Based on the detection result, an HTML snapshot can be created. For example, a new HTML page can be created such that the background of the HTML page is based on the application snapshot. For all detected elements (text, widgets, other resources, etc.), absolutely positioned <div> elements can be placed in the page. For example, the HTML background may contain a message box. <Div> elements may be placed around the HTML code corresponding to the text box. The resulting HTML page can be transformed into an HTML based final snapshot. This example is illustrative, and other techniques for generating HTML or snapshots in other formats can be used.

A similar approach can be used for different types of desktop applications that allow programmatic access to the presented interface and/or where an operating system can provide details of presented interfaces. In those cases, a desktop application in accordance with embodiments of the disclosed subject matter can access data of the captured application directly (when possible) or through an emulator. The interface can be recreated as an HTML page based on the data found. The recreated interface can be sent to the server.

Interface resources can be aspects of the application interface that can be edited by a localization expert using a localization interface. For example, an application message that includes the word "Welcome!" may be shown in a localization interface in a context similar or identical to the way it appears in the corresponding application interface. The localization interface may (perhaps unlike the application interface) render this message in such a way as to make it editable by the localization expert, e.g., by modifying "Welcome!" to "Bienvenue!" to help localize an English-based application interface to a French language user base. In this manner, the localization expert can visually see the context in which the interface resource is embedded in the interface, and localize the interface resource accordingly. The localization expert can thus provide a localization edit of the interface resource directly within the provided localization interface. The localization interface can act as a What You See Is What You Get (WYSIWYG) editing facility to localize application interface resources. By preserving context information of the application interface in the localization interface, the localization expert can better determine the appropriate localization edits to accurately convey the best meaning possible to the user in the localized environment.

According to embodiments of the disclosed subject matter, a resource file associated with an application, which contains file resources, may be received. The resource file containing the file resources can be associated with the application such that the resource file is used when compiling the application and may determine, at least in part, what elements are included in the application interface. The application based on the resource file can contain aspects that may be localizable. File resources within the resource file may be associated with the aspects of the application that may be localizable. In some embodiments, each file resource may correspond to a localizable aspect in the application interface. Accordingly, editing a file resource within the resource file can subsequently alter an application when the application is later compiled using the edited (localized) resource file.

A localization file resource can be a file containing localization interface resources and/or references thereto. The localization file resource can be based upon an application file resource provided by, for example, the developer of the application; information extracted from outputs of one or more instances of the application itself, such as from HTML code generated by the application; or resources extracted from one or more snapshots of the application interfaces. In an example process a localization file resource corresponding to a localization interface resource may be identified. The identification may occur before or after rendering a localization interface to a localization expert. This correspondence can be used to relate a localization interface onscreen edit to a resource in the localization resource file. Thus, a change to the onscreen resource can be reflected in a change to the corresponding resource in the localization resource file.

The localization file resource that corresponds to the resource modified onscreen by the localization expert can be identified by comparing the localization resource being modified to resources in the localization file. A match can be made based upon the similarity between the contents of the onscreen resource and the localization file resource. For example, if an onscreen resource originally contained the text string "Hello", then the text string "Hello" may be matched to the localization file resource containing the same or similar text string. Based on the matching, a corresponding localization file recourse can be identified. Once the corresponding localization file resource is identified, it can be modified in accordance with the change made to the onscreen resource by the localization expert. The modified localization resource file can later be used directly or can be used to generate an application resource file that can be compiled or included by the developer with the rest of the application. The result can be a localized application in which the application resources have been modified by the localization expert.

According to some embodiments of the disclosed subject matter, the implementation may identify a localization file resource corresponding to an interface resource by converting the file resource to a regular expression and comparing the regular expression to the interface resource. For example the file resource may be:

"The user % s has % d messages."

A regular expression of the file resource can be:

"The user [^< >]* has [0-9]+ messages."

According to an embodiment of the disclosed subject matter, file resources corresponding to an interface resource may be identified by individually labeling the file resources to create specially augmented default file resources. Labeling the file resources may distinguish a file resource from other file resources within the resource file. The labels may be inserted both in the beginning and the end of a file resource and can accordingly mark the beginning and end of the resource. For example, a file resource may originally be:

"User % s is done"

An augmented version of the file resource can be:

"{U+1234} User % is done {U+1235}."

A corresponding interface and interface resources may be generated based on the augmented default file resources and rendered to a localization expert. The labels may include non-rendered characters that may be detectable by a machine, but not appear to a localization expert in the localization interface. If the localization expert provides a localization edit through the localization interface, the corresponding resource in the localization file resource can be identified based upon comparing the labels around the onscreen resource being edited and the labels around resources in the localization resource file. The corresponding localization file resource may be modified based on the localization edit, and subsequently a localized application may be compiled based upon the modified localization resource file. The implementation can reduce or eliminate improper localizations caused by mismatches by matching the localization edit within the localization interface with the correspondingly labeled resource element in the localization resource file. As an illustrative example, as shown in Table 1, the term "Enter", which represents asking a user to press the enter key, corresponds to the third file resource within the localization resource file. Without any labeling, the second and third file resources may not be differentiable. However, after labeling the resources, each resource is distinguished by the labels assigned to the beginning and end of the resource. Thereafter, the generated interface resources can contain a matching label as shown in Table 1. The interface resource can therefore be matched to the corresponding augmented default file resource.

TABLE 1

| Resource file location | Context | File Resource | Augmented Default File Resource (DAFR) | Interface Resource based on DAFR |
|---|---|---|---|---|
| 1 | Exit page | Exit | {U + 1000} Exit {U + 1001} | {U + 1000} Exit {U + 1001} |
| 2 | Enter page | Enter | {U + 2000} Enter {U + 2001} | {U + 2000} Enter {U + 2001} |
| 3 | Press Enter key | Enter | {U + 3000} Enter {U + 3001} | {U + 3000} Enter {U + 3001} |

TABLE 1-continued

| Resource file location | Context | File Resource | Augmented Default File Resource (DAFR) | Interface Resource based on DAFR |
|---|---|---|---|---|
| 4 | Agree to terms | Agree | {U + 4000} Agree {U + 4001} | {U + 4000} Agree {U + 4001} |

A localization of the phrase "Enter" in the application that asks the user to press the Enter Key would be matched only with the corresponding localization resource file resource. Accordingly, a localized version of the phrase "Enter" can be matched with the proper augmented default file resource and the use of that file resource to compile the application can result in a properly localized application.

A localization interface built with captured context information can be made editable in accordance with embodiments of the disclosed subject matter. For example, resources in a snapshot HTML code version of an application interface can be marked with HTML tags containing custom attributes with data describing the resource. When the snapshot is loaded in the application, those marking tags in the snapshot are identified and can be assigned events that will display a localization interface that makes the resource editable by the localization expert. For example, consider two example resources:

test.message.1 = "Logout"
test.message.2 = "Hello %s!"

An example original snapshot HTML text contains:
. . . <div>Hello John! <span>Logout</span></div> . . .
The snapshot HTML with markings can be:

```
...<div>
    <span msg="test.message.1">Hello John!</span>
    <span><span msg="test.message.2">Logout</span></span>
</div>...
```

According to an embodiment of the disclosed subject matter, code can be added to aid in localization:

```
// Load the snapshot to an iframe element
iframe.url = 'http://my.server.com/snapshot?id=1234'
// after loading find all marked elements:
var snapshotHtml = iframe.getHtmlNode( );
var allSpanElements =
    snapshotHtml.getElementsByTagName('span');
for (var span : allSpanElements) {
    // look for span elements with a 'msg' attribute
    if (span.hasAttribute('msg')) {
        // add event happening when user clicks on the message
        span.onClick(function(e) {
            var messageId = e.target.getAttribute('msg');
            // retrieve data of the message from backend
            var messageData =
                BackendService.getDataForMessage(messageId);
            // Show the pre-existing UI
            // element with details of the message
            TranslationUIElement.getInstance( ).show(messageDetails);
        });
    }
}
```

Context information provided to a localization expert may contain components which are localizable but, given the form of the context information, cannot be localized by the localization expert. Accordingly, there is a need to allow a localization expert to indicate the localizability of those components.

Figure 4:
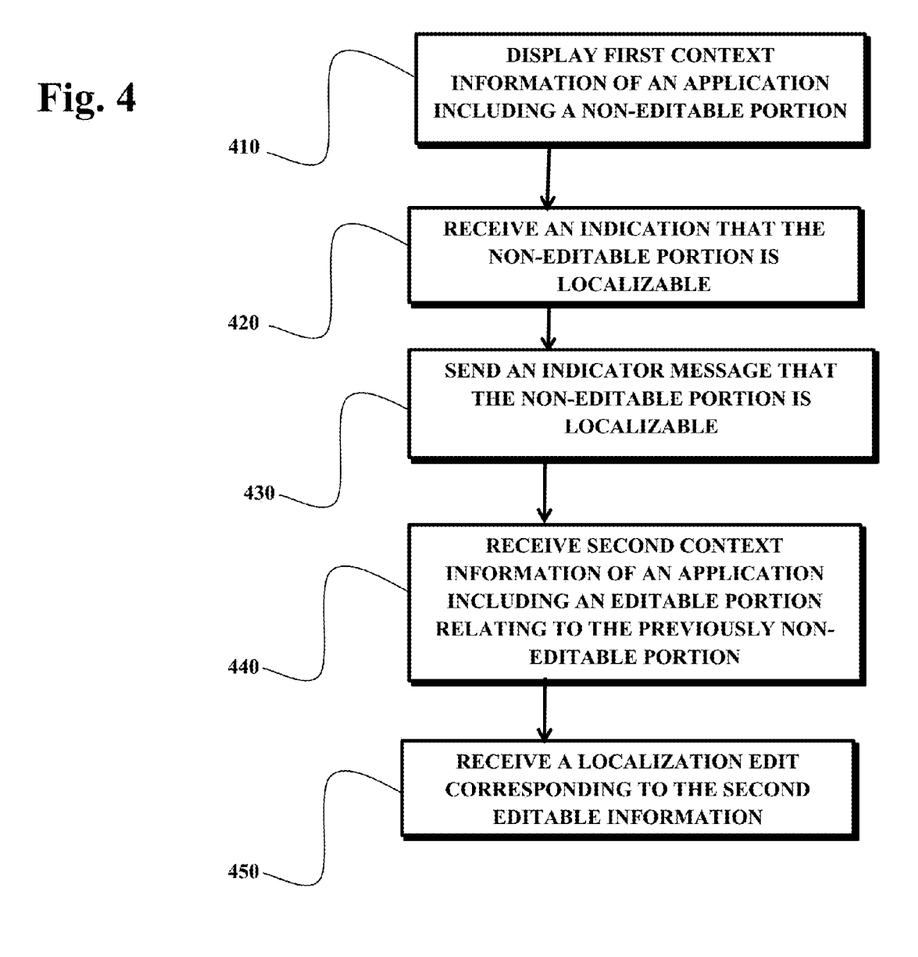
FIG. 4 shows an example process for indicating additional localizable portions of an application according to an embodiment of the disclosed subject matter.

According to an embodiment of the disclosed subject matter, context information may include editable and non-editable portions. FIG. 4 shows an example process for gathering context information containing editable portions and non-editable portions based on an application. The context information including the editable and non-editable portions may be rendered to a localization expert, as shown at 410, and the expert may provide localization edits for the editable portions of the context information. The localization edits to the editable text portions may modify character properties, font, font style, text effect, spacing, color or the like of a text string. Alternatively, the localization edits to the editable non-text portions may modify the size, color, scaling ratio, shade, brightness, contrast, content, shadow, artistic effect, reflection settings, bevel or the like of a non-text component of the context information.

An image including text may be treated as either an image or a text string or a combination of the two. Accordingly, if an image contains text, it may be modified by using the techniques disclosed herein for text portions or by using the techniques disclosed herein for non-text portions. For example, an image containing the text "Hello!" may be modified either by changing the font of the text "Hello!" within the image or by adding a shadow effect to the image.

The localization expert may determine that the editable portions of the context information do not encompass all the localizable portions of the context information. The non-editable yet localizable portions may not be editable due to an invalid user determination of the localizable aspects of the application, a user error in selecting editable aspects of the context information, machine error in detecting localizable aspects, or the like. Accordingly, the localization expert may provide an indication at 420 based on the non-editable yet localizable aspect of the context information. The indication may specify, for example, that the one or more non-editable portions of the context information should be editable, or that a non-editable portion is not optimal for one or more locales. At 430, an indicator message based on the indication by the localization expert may be received. Additional (second) context information of an application, including an editable portion relating to the previously indicated non-editable portion, may be provided to the localization expert at 440. The localization expert may provide a localization edit based on the second context information, and a localized application may be compiled accordingly.

Figure 5:
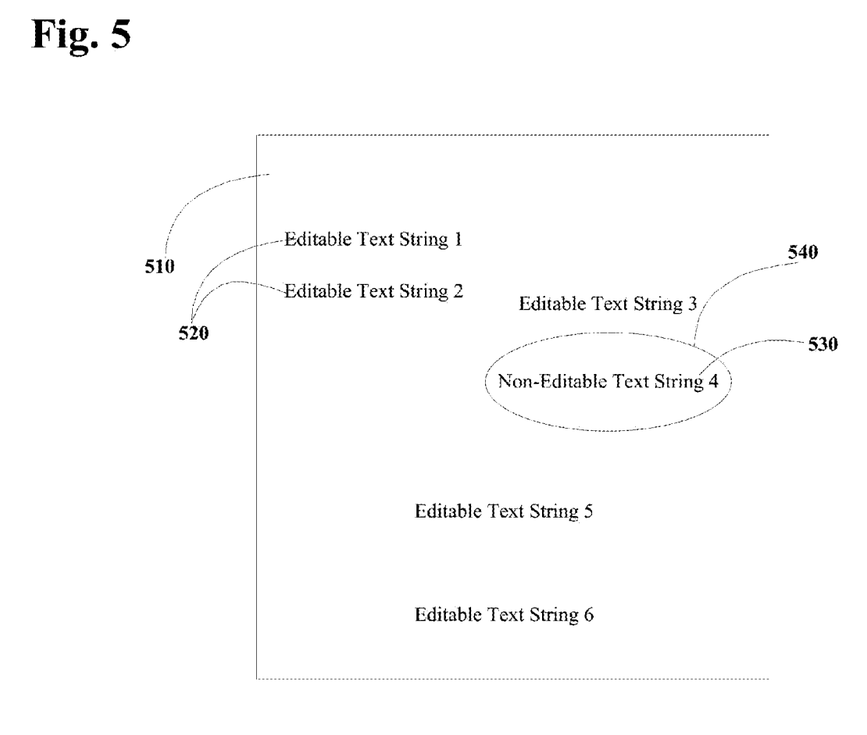
FIG. 5 shows an example arrangement for indicating additional text based localizable portions of an application according to an embodiment of the disclosed subject matter.

For illustrative purposes, an example process for performing step 420 is further illustrated in FIG. 5, which shows context information 510 that can be rendered to a localization expert. The context information can contain one or more editable text strings 520 and/or one or more non-editable text strings 530. According to the current example, the localization expert may determine that the non-editable text string 530 labeled "Non-Editable Text String 4" is localizable and thus should be editable. The localization expert may indicate that the text string 530 is localizable by highlighting the text string.

Figure 6:
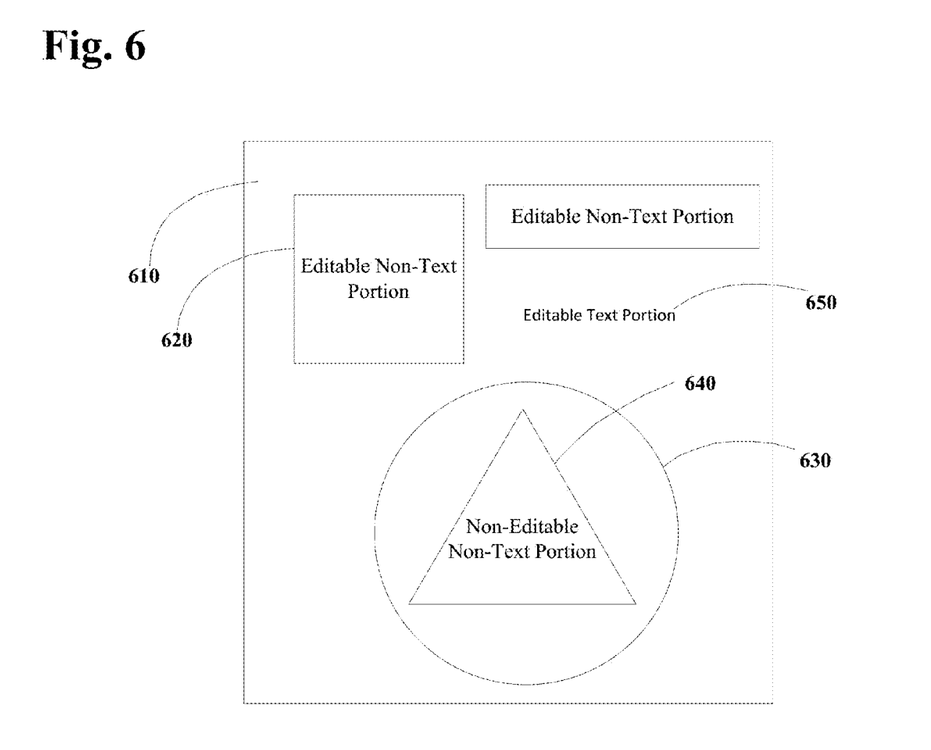
FIG. 6 shows an example arrangement for indicating additional non-text based localizable portions of an application according to an embodiment of the disclosed subject matter.

In another example, step 420 of receiving an indication that a non-editable portion is localizable, with regards to non-text components, may be understood with respect to FIG. 6. FIG. 6 shows context information 610 which can be rendered to a localization expert. The context information can contain one or more editable text portions 650 and one or more non-text portions 620. Additionally, the context information can contain a non-editable non-text portion 640. The localization expert may determine, for example, that the non-editable non-text portion 640 is localizable. The localization expert may indicate that this portion is localizable by applying a highlight 630 or other indication to the non-editable non-text portion.

Figure 7:
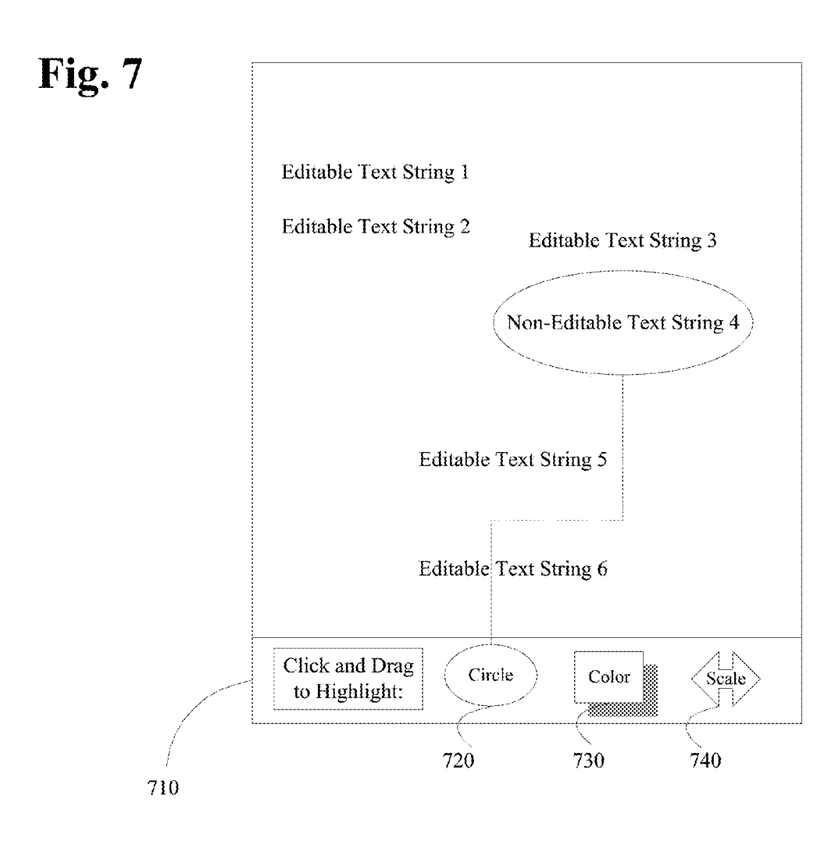
FIG. 7 shows an example pre-prepared highlighting panel according to an embodiment of the disclosed subject matter.

Highlighting such as illustrated at 630 can include any manner of distinguishing the non-editable aspect of the context information from other aspects of the context information. For example, as shown in FIG. 7, the highlighting may include circling 720, emphasizing, changing a background color 730, changing a text color 730, discoloring 730, scaling or other transformation 740, or the like, any of which may be performed on the text portion of the context information. Alternatively, the highlighting may include circling 720, emphasizing, changing a background color 730, changing a foreground color 730, discoloring 730, scaling or other transformation 740, or the like, any of which may be performed on the non-text portion of the context information.

The localization expert may perform the highlighting manually or by using provided techniques for highlighting. The localization expert may conduct the manual highlighting by using any external software to highlight the provided context information. Alternatively, the highlighting can be conducted by printing a tangible copy based on the context information and highlighting using the printed copy. The printed copy may be converted to an electronic copy. As shown in FIG. 7, provided techniques may allow a localization expert to highlight one or more portions of the context information directly while viewing the context information. For example, a highlighting panel 710 containing highlighting buttons or icons 720, 730, 740 or other suitable interface elements may be displayed and made available for the localization expert to click on to implement various highlights.

According to embodiments of the disclosed subject matter, the indication by the localization expert regarding a non-editable localizable component may contain a priority ranking. The priority ranking may be based on the importance of localizing a highlighted non-editable text portion, as determined by the localization expert. For example, the localization expert may assign a relatively high priority ranking to a highlighted portion to indicate that it is very important that the non-editable portion should be localized, or a medium or lower priority ranking to indicate that it is somewhat important or not important, respectively, that the non-editable portion should be localized. According to an illustrative example, a localization expert may highlight two non-editable portions of a banking application. The first non-editable portion may be a text string or a non-text component which displays the amount of money in a user's bank account. The second non-editable portion may be a text string or a non-text component which greets the user by displaying "Hello". The localization expert may assign a high priority to the highlighted non-editable display of the amount of money in a user's bank account. The localization expert may assign a low priority to the highlighted non-editable display which greets a user.

Figure 8:
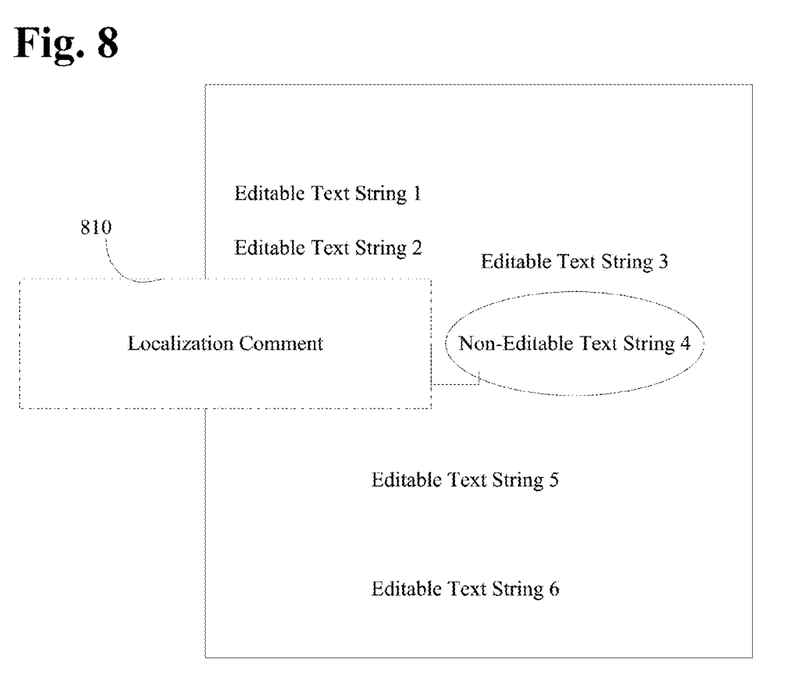
FIG. 8 shows an example localization comment according to an embodiment of the disclosed subject matter.

As shown in FIG. 8, according to an embodiment of the disclosed subject matter, a localization comment which corresponds to the indication based on the non-editable text or non-text portion of the context information may be received. The comment may provide an explanation of the reasoning behind the indication provided by the localization expert. For example, if the localization expert highlights "Non-editable text string 4" within the context information, the localization expert may add a comment 810 corresponding to the highlight. As an example, the reasoning behind the indication may be that the text or non-text component is not optimal for the locale for which the localization expert is localizing the application. As another example, the comment may contain a suggestion for a change which can be made to the non-editable text or non-text portion of the context information. As another example, if the localization expert highlights an image within the context information, the corresponding comment may contain a suggestion regarding how to modify the image such that it is optimal for the respective locale.

An indicator message may be received based on the indication that a non-editable portion of the first context information is localizable. The indicator message can be provided to a developer or a machine designator, and may be the highlighted context information or a message based on the highlighted context information. Additionally, the indicator message may be based on the priority ranking and/or the localization comment. For example, a high priority ranking may correspond to a more urgent indicator message, whereas a low priority ranking may correspond to a less urgent indicator message. Further, the indicator message may be based on one or more predetermined rules. The predetermined rules may include an automatic reject rule such that the implementation is configured to automatically reject any indications by the localization expert. The predetermined rules may include an automatic accept rule such that the implementation is configured to automatically accept any indications by the localization expert. The predetermined rules may include a component that specifies whether indications should be accepted or rejected based upon the identity of the associated localization expert, so that in at least some cases only indications by certain localization experts are accepted and indications by other localization experts are rejected. The developer or a machine designator may use the indicator message to determine an action for further localization.

The localization expert can be provided second context information based on the highlighted non-editable text portion of the original context information. The second context information can contain an editable portion corresponding to the original highlighted non-editable portion. For example, a text string or non-text component may not be editable in the original context information, and may be highlighted by a localization expert. The second context information provided to the localization expert can contain the same or similar text string or non-text component in an editable format.

The localization expert can provide a localization edit for the editable portion of the second context information. The localization edit may include modifying character properties, font, font style, text effect, spacing, color, or the like of a text string corresponding to the second context information. Alternatively, the localization edit may include modifying the size, color, scaling ratio, shade, brightness, contrast, content, shadow, artistic effect, reflection settings, bevel or the like of a non-text component of the context information corresponding to the second context information. The application may be compiled based on the localization edit corresponding to the editable portion of the second context information, resulting in a localized application.

Figure 1:
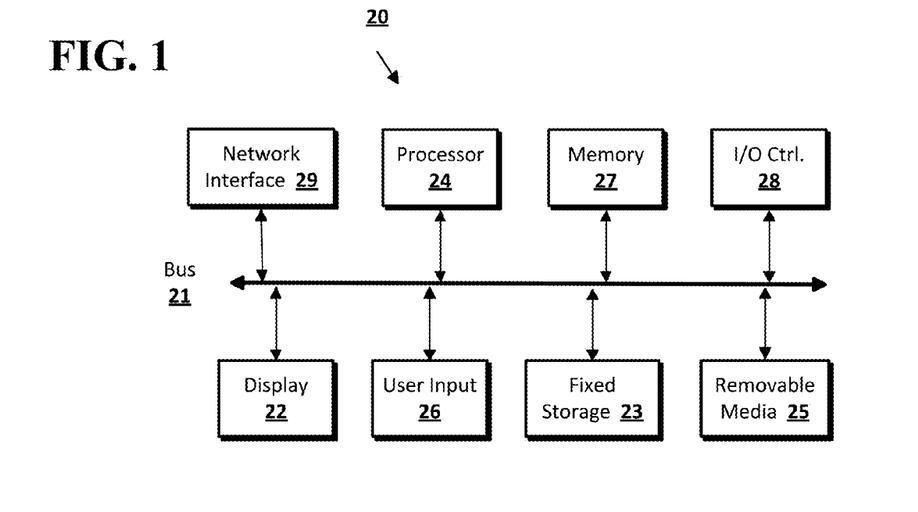
FIG. 1 shows a computer according to an embodiment of the disclosed subject matter.

Embodiments of the presently disclosed subject matter may be implemented in and used with a variety of component and network architectures. FIG. 1 is an example computer 20 suitable for implementing embodiments of the presently disclosed subject matter. The computer 20 includes a bus 21 which interconnects major components of the computer 20, such as a central processor 24, a memory 27 (typically RAM, but which may also include ROM, flash RAM, or the like), an input/output controller 28, a user display 22, such as a display screen via a display adapter, a user input interface 26, which may include one or more controllers and associated user input devices such as a keyboard, mouse, and the like, and may be closely coupled to the I/O controller 28, fixed storage 23, such as a hard drive, flash storage, Fibre Channel network, SAN device, SCSI device, and the like, and a removable media component 25 operative to control and receive an optical disk, flash drive, and the like.

The bus 21 allows data communication between the central processor 24 and the memory 27, which may include read-only memory (ROM) or flash memory (neither shown), and random access memory (RAM) (not shown), as previously noted. The RAM can include the main memory into which the operating system and application programs are loaded. The ROM or flash memory can contain, among other code, the Basic Input-Output system (BIOS) which controls basic hardware operation such as the interaction with peripheral components. Applications resident with the computer 20 can be stored on and accessed via a computer readable medium, such as a hard disk drive (e.g., fixed storage 23), an optical drive, floppy disk, or other storage medium 25.

The fixed storage 23 may be integral with the computer 20 or may be separate and accessed through other interfaces. A network interface 29 may provide a direct connection to a remote server via a telephone link, to the Internet via an internet service provider (ISP), or a direct connection to a remote server via a direct network link to the Internet via a POP (point of presence) or other technique. The network interface 29 may provide such connection using wireless techniques, including digital cellular telephone connection, Cellular Digital Packet Data (CDPD) connection, digital satellite data connection or the like. For example, the network interface 29 may allow the computer to communicate with other computers via one or more local, wide-area, or other networks, as shown in FIG. 2.

Many other devices or components (not shown) may be connected in a similar manner (e.g., document scanners, digital cameras and so on). Conversely, all of the components shown in FIG. 1 need not be present to practice the present disclosure. The components can be interconnected in different ways from that shown. The operation of a computer such as that shown in FIG. 1 is readily known in the art and is not discussed in detail in this application. Code to implement the present disclosure can be stored in computer-readable storage media such as one or more of the memory 27, fixed storage 23, removable media 25, or on a remote storage location.

Figure 2:
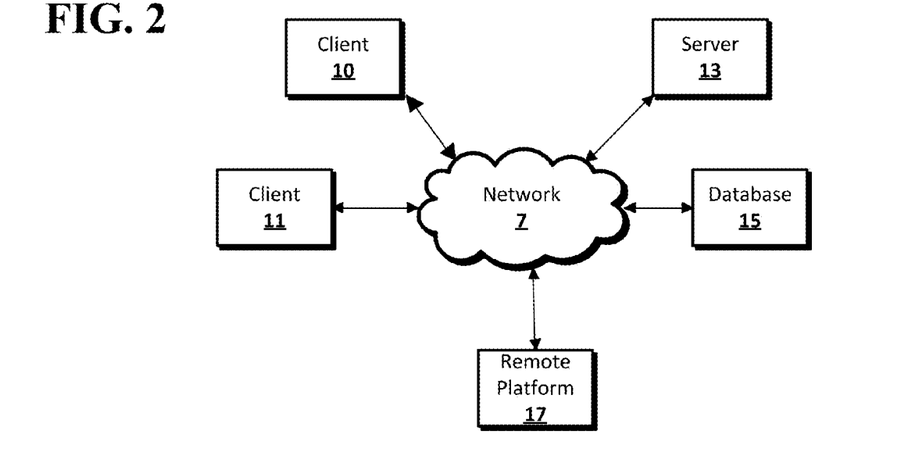
FIG. 2 shows a network configuration according to an embodiment of the disclosed subject matter.

FIG. 2 shows an example network arrangement according to an embodiment of the disclosed subject matter. One or more clients 10, 11, such as local computers, smart phones, tablet computing devices, and the like may connect to other devices via one or more networks 7. The network may be a local network, wide-area network, the Internet, or any other suitable communication network or networks, and may be implemented on any suitable platform including wired and/or wireless networks. The clients may communicate with one or more servers 13 and/or databases 15. The devices may be directly accessible by the clients 10, 11, or one or more other devices may provide intermediary access such as where a server 13 provides access to resources stored in a database 15. The clients 10, 11 also may access remote platforms 17 or services provided by remote platforms 17 such as cloud computing arrangements and services. The remote platform 17 may include one or more servers 13 and/or databases 15.

More generally, various embodiments of the presently disclosed subject matter may include or be embodied in the form of computer-implemented processes and apparatuses for practicing those processes. Embodiments also may be embodied in the form of a computer program product having computer program code containing instructions embodied in non-transitory and/or tangible media, such as floppy diskettes, CD-ROMs, hard drives, USB (universal serial bus) drives, or any other machine readable storage medium, wherein, when the computer program code is loaded into and executed by a computer, the computer becomes an apparatus for practicing embodiments of the disclosed subject matter. Embodiments also may be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing embodiments of the disclosed subject matter. When implemented on a general-purpose microprocessor, the computer program code segments configure the microprocessor to create specific logic circuits. In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions. Embodiments may be implemented using hardware that may include a processor, such as a general purpose microprocessor and/or an Application Specific Integrated Circuit (ASIC) that embodies all or part of the techniques according to embodiments of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to embodiments of the disclosed subject matter.

The foregoing description, for purpose of explanation, has been described with reference to specific embodiments. However, the illustrative discussions above are not intended to be exhaustive or to limit embodiments of the disclosed subject matter to the precise forms disclosed. Many modifications and variations are possible in view of the above teachings. The embodiments were chosen and described in order to explain the principles of embodiments of the disclosed subject matter and their practical applications, to thereby enable others skilled in the art to utilize those embodiments as well as various embodiments with various modifications as may be suited to the particular use contemplated.

The invention claimed is:

1. A computer-implemented method, comprising:
providing, from a computer having one or more processors, a localization interface for localizing an application, the localization interface including first context information for an interface of the application having a first editable portion and one or more non-editable portions of the application, wherein at least one of the one or more non-editable portions is non-text based;
receiving, at the computer and via the localization interface, a first localization edit for the first editable portion of the first context information;
receiving, at the computer and via the localization interface, an indicator message that indicates a selection of a particular non-editable portion of the one or more non-editable portions, the selection indicating that the particular non-editable portion is localizable;
providing, from the computer and in response to the indicator message, second context information for the interface of the application in the localization interface, the second context information having a second editable portion corresponding to the particular non-editable portion;
receiving, at the computer and via the localization interface, a second localization edit for the second editable portion of the second context information; and
compiling, at the computer, a localized version of the application based on the first and second localization edits.

2. The computer-implemented method of claim 1, wherein the indicator message includes a priority ranking indicative of an importance of localizing the particular non-editable portion.

3. The computer-implemented method of claim 2, wherein the priority ranking is one of a high priority, a medium priority, and a low priority.

4. The computer-implemented method of claim 1, wherein at least one of the first and second localization edits includes a modification of character, font, font style, text effect, spacing, or color corresponding to the second editable portion.

5. The computer-implemented method of claim 1, wherein at least one of the first and second localization edits includes a modification of the size, color, scaling ratio, shade, brightness, contrast, content, shadow, artistic effect, reflection settings, or bevel.

6. The computer-implemented method of claim 1, wherein the particular non-editable portion comprises an image.

7. The computer-implemented method of claim 1, wherein the particular non-editable portion is non-text based.

8. The computer-implemented method of claim 1, wherein the indicator message includes a localization comment corresponding to the particular non-editable portion, the localization comment comprising an explanation of the indication that the particular non-editable portion is localizable.

9. The computer-implemented method of claim 1, wherein the first context information is a snapshot based on the application.

10. The computer-implemented method of claim 9, wherein the indicator message includes a highlighted version of the snapshot based on the application.

11. A computing system, comprising:
one or more processors; and
a non-transitory computer-readable storage medium having a plurality of instructions stored thereon, which, when executed by the one or more processors, cause the one or more processors to perform operations comprising:
providing a localization interface for localizing an application, the localization interface including first context information for an interface of the application having a first editable portion and one or more non-editable portions of the application, wherein at least one of the one or more non-editable portions is non-text based;
receiving, via the localization interface, a first localization edit for the first editable portion of the first context information;
receiving, via the localization interface, an indicator message that indicates a selection of a particular non-editable portion of the one or more noneditable portions, the selection indicating that the particular non-editable portion is localizable;
providing, in response to the indicator message, second context information for the interface of the application in the localization interface, the second context information having a second editable portion corresponding to the particular non-editable portion;

receiving, via the localization interface, a second localization edit for the second editable portion of the second context information; and compiling a localized version of the application based on the first and second localization edits.

12. The computing system of claim 11, wherein the indicator message includes a priority ranking indicative of an importance of localizing the particular noneditable portion.

13. The computing system of claim 12, wherein the priority ranking is one of a high priority, a medium priority, and a low priority.

14. The computing system of claim 11, wherein at least one of the first and second localization edits includes a modification of character, font, font style, text effect, spacing, or color corresponding to the second editable portion.

15. The computing system of claim 11, wherein at least one of the first and second localization edits includes a modification of the size, color, scaling ratio, shade, brightness, contrast, content, shadow, artistic effect, reflection settings, or bevel.

16. The computing system of claim 11, wherein the particular non-editable portion comprises an image.

17. The computing system of claim 11, wherein the particular non-editable portion is non-text based.

18. The computing system of claim 11, wherein the indicator message includes a localization comment corresponding to the particular non-editable portion, the localization comment comprising an explanation of the indication that the particular noneditable portion is localizable.

19. The computing system of claim 11, wherein the first context information is a snapshot based on the application.

20. The computing system of claim 19, wherein the indicator message includes a highlighted version of the snapshot based on the application.

\* \* \* \* \*